United States Patent [19]
Rosenstock

[11] 4,148,041
[45] Apr. 3, 1979

[54] METHOD AND APPARATUS FOR PURGING AIR FROM JET INK WRITING SYSTEMS

[75] Inventor: Günter Rosenstock, Munich, Fed. Rep. of Germany

[73] Assignee: Siemens Aktiengesellschaft, Berlin & Munich, Fed. Rep. of Germany

[21] Appl. No.: 874,204

[22] Filed: Feb. 1, 1978

[30] Foreign Application Priority Data

Feb. 4, 1977 [DE] Fed. Rep. of Germany ....... 2704704

[51] Int. Cl.[2] .............................................. G01D 15/16
[52] U.S. Cl. ................................................ 346/140 R
[58] Field of Search .............................. 346/140 R, 75

[56] References Cited

U.S. PATENT DOCUMENTS

| | | | |
|---|---|---|---|
| 3,596,275 | 7/1971 | Sweet | 346/75 X |
| 3,832,579 | 8/1974 | Arndt | 346/140 RX |
| 3,974,508 | 10/1976 | Blumenthal | 346/140 X |

*Primary Examiner*—Joseph W. Hartary
*Attorney, Agent, or Firm*—Hill, Gross, Simpson, Van Santen, Steadman, Chiara & Simpson

[57] ABSTRACT

An ink head printer is disclosed having an interchangeable ink supply tank detachably attachable to the printing head assembly to supply ink to the printing head. In order to eliminate air bubbles at the on set of use of the printing head assembly, the printing head is flushed with isoparaffin supplied from a flushing tank attached to the printing head in substitution for an ink supply tank.

7 Claims, 3 Drawing Figures

METHOD AND APPARATUS FOR PURGING AIR FROM JET INK WRITING SYSTEMS

BACKGROUND OF THE INVENTION

1. Field of the Invention

This invention relates to printing devices and more particularly to a method and means for flushing air from a printing head prior to initial use when the printing head is equipped with a removable ink supply tank.

2. Prior Art

In printing equipment of the type utilizing liquid ink, a printer head which is mounted for movement adjacent a recording carrier, such as paper, may be supplied from a liquid ink supply which includes a supply flask containing the printing ink. Such equipment may, for example, comprise a mosaic printer head having a plurality of piezoelectrically operated printing ink jet nozzles arranged at an operating face of the printer head. Such printing heads are automatically supplied with printing ink by means of the contraction process of the individual printing jets operating in the print head.

In order for such ink jet printers to operate properly in accordance with the physical principles utilized in their operation, it is imperative that all air be eliminated from the ink supply system. As a step in the elimination of air, it has been suggested to provide a device within the ink supply tank which will make it possible to increase the tank pressure and, thus, the pressure on the ink supply for short periods of time in order to force ink through the printer head so as to flush the printer head with the intention of expelling all air from within the printer head.

However, it is common practice to form the printer head from a casting resin. Such casting resins frequently have physical characteristics such that they are only poorly wetted with ink even when the printing head is filled with ink. Thus, particularly when using casting resins, and particularly at the beginning of operation of an individual print head it is possible that the ink supply channels will not be ink wetted even though the individual channels will be otherwise filled with ink. In this instance, small air bubbles will remain within the channels, adhere to the channels walls. The small air bubbles cannot be flushed even if the printing head is subjected to continuous flushing by printing ink. Such enclosed air bubbles can act to prevent proper expulsion of the ink drops from the printer head particularly since they are able to act in a manner which absorbs the pressure surges generated by the piezo transducers. Thus, the printing head will not properly function until all of the air bubbles have been dissolved in the printing ink which may take some considerable period of time. Therefore, the printing head is not immediately available for printing.

This problem has been previously considered, and as a attempted solution thereto, it has been suggested to eliminate such de-aerating problems when exchanging printing heads by filling the printing heads with a neutral colorless liquid during storage and transport. See for example German Offenlegungsschrift No. 2,317,911. According to this method, the printing head is placed in a special transport container during transport, as for example, from the factory to the print head utilizer. After removal of the print head from the transport container and connection of the print head to the printing device, the print head is activated for a period of time. The neutral liquid which is ejected from the print head during this initial activation period is diverted from the working phase of the print head and is absorbed in some manner until such time at the stream emitted from the print head becomes the stream of printing ink from the ink supply. While this type of approach reduces the aeration problem, it is extremely expensive and requires a multiplicity of specific technical devices and makes transportation and storage cumbersome. It would therefore be an improvement in the art to provide a method and apparatus for properly de-aerating printing heads, particularly of the ink jet type which proceeds in a simple and inexpensive manner to eliminate the problem of small air bubble entrapment within the printing head, particularly at the onset of initial use of a printing head.

SUMMARY OF THE INVENTION

It is therefore a principal object of this invention to provide a method and means for ventillating or de-aerating printing heads used in ink printing equipment which provides a simple and inexpensive solution to the problem of avoiding air entrapment within the printing head, particularly the type of air entrapment which occurs at the onset of use of a newer replacement printing head.

The objective is inventively met by providing a flushing liquid tank which is filled with flushing liquid and which is equipped with a means for temporarily increasing pressure of the flushing liquid. The flushing liquid does not mix with the printing liquid or ink and is of a type which will completely wet the print head material. In a preferred embodiment illustrated the flushing liquid tank is connected to the normal printing head ink supply system and is used through that system to properly strip the printing head of air. In those instances, where the printing head assembly is provided with a detachable ink supply container the flushing liquid tank is designed to be employed in place of the standard ink supply tank.

Further, in a particularly advantageous embodiment the flushing liquid tank is equipped with a receiving means for receiving a waste flushing liquid which is discharged from the print head during flushing. Moreover, in the preferred embodiment an isoparaffin is utilized as the flushing liquid.

Therefore, this invention advantageously avoids, in a simple and inexpensive manner, the problem of air bubbles remaining within the printing head during filling of the printing head initially with ink, which air bubbles would otherwise interfere with the printing operation. Instead of first using a standard ink supply tank, a correspondingly designed flushing liquid tank is employed to eliminate air bubbles by properly flushing the printing head with an appropriate wetting liquid. By utilizing exchangeable ink and wetting liquid tanks, proper set up of the printing head for operation is greatly simplified and substantially air free.

It is therefore an object of this invention to provide method and apparatus for flushing a printer head of air.

It is another more particular object of this invention to provide a method and apparatus for flushing the ink supply channels of an ink jet printer head of air by flowing a wetting agent through the channels prior to providing printing ink to the print head.

It is a more particular object of this invention to provide method and apparatus for flushing the ink supply channels of a piezoelectric ink jet printer head assembly equipped with replaceable ink supply tanks by flushing the channels with a wetting liquid initially provided in a wetting liquid tank dimensioned to be received in place of the ink supply tank and attached to the printing head assembly in the manner of an ink supply tank, the wetting liquid tank being equipped with means for increasing pressure on the wetting liquid within the tank to force it through the channels and being further provided with means for receiving excess wetting liquid dispensed from the printing head.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
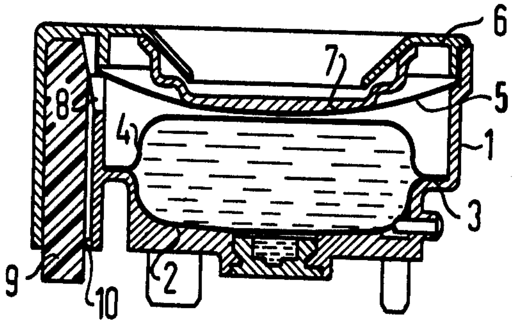
FIG. 1 is a cross-sectional view of a wetting liquid tank according to this invention.

The flushing liquid tank of this invention consists of a support member 1 which is constructed from a synthetic material by injection molding. Of course, other forming processes may be used. The member 1 has an internal central depression forming a tub-shaped portion 2. The tub-shaped portion 2 is covered by a flexible synthetic material film 4 which is sealed or welded at its peripheral edges 3 such that the film 4 cooperates with the tub-shaped portion 2 to form a half-flexible bubble chamber accommodating the flushing liquid.

The peripheral wall of the member 1 extends upwardly beyond the bubble area and forms a secondary container which may be sealed by an elastic flexible membrane 5. The membrane 5 is clamped to the wall of the member 1 by means of an overfitting lid or cover 6 which has a central funnel-shaped opening therethrough. A cup-shaped member 7 is positioned under the lid 6 covering the membrane 5 in the area of the funnel-shaped opening. The membrane 5 resiliently holds the member 7 in place against the undersurface of the lid 6 closing the opening in the lid 6.

By means of the funnel-shaped opening of the lid 6, a pressure can be exerted on the flushing liquid containing a chamber through the member 7. Thus, the member can be depressed through the opening in the lid 6 against the resilience of the membrane 5 to increase the pressure on the flushing liquid within the flushing liquid chamber. In the embodiment illustrated, a bottom stopper can be provided in the member 1 which, for example, can be pierced by a supply needle in the portion of the printing head which is equipped to receive the flushing liquid tank. The supply needle can then pierce through to the flushing liquid chamber communicating the flushing liquid chamber to the print head.

Figure 3:
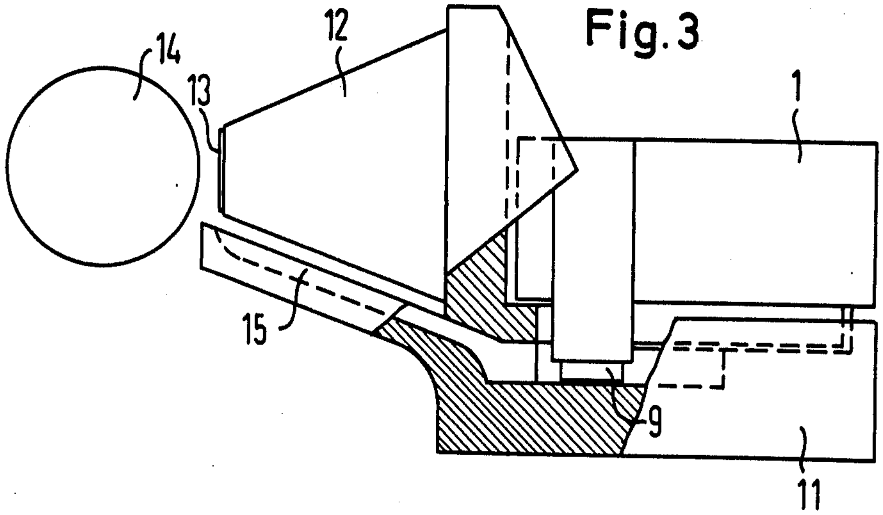
FIG. 3 is a schematic side view, partially in section, of a printing hear equipped with the wetting liquid tank of this invention.

Referring now to FIG. 3, a print head 12 of the afore-described type used in an ink mosaic printing device may be built into a print carriage 11. The print head consisting of a castable resin will have internal channels for dispersion of ink to the operating face of the print head. The resin of which the print head is formed may be such that the interior channels will only be poorly wetted by the printing liquid or ink to be utilized in the device. Therefore, when the print head 12 is used for the first time, a sufficient wetting might not occur if the device were first to be subjected to a usage with printing liquid. In this instance, the flushing liquid tank of FIG. 1 may be affixed to the printing carriage 11 via a locking device, which is not illustrated here, in place of the ink supply tank which would normally be affixed to the carriage 11 at that point. To this end the flushing liquid tank is designed with similar interfitting dimensions so that it can be attached to the overall printing assembly in place of standard ink supply tanks. When inserted, the piercing needle will penetrate the base of the tub-shaped depression 2 communicating the flushing liquid chamber to the ink supply channels of the print head.

A flushing liquid is preferably used which does not mix with the printing liquid or ink which is normally utilized. The flushing liquid further is of the type which will completely wet the material of the print head and can, for example, be an isoparaffin.

After attaching the flushing liquid tank to the print head assembly, by means of a manual pressure upon the member 7, the flushing liquid will be forced through the ink supply channels of the print head assembly such that the flushing liquid will fill the total available openings in the print head without the adherence of any air bubbles therein. Excess flushing liquid will be emitted from the discharge openings of the piezoelectric print head 12 and will be deflected to a return channel 15 by means of an ink rejection orifice cover 13. The use of this cover 13 prevents soiling of the platen 14.

The excess flushing liquid flowing through the return channel 15 is directed back towards the flushing liquid tank to a point where it will be absorbed in a reservoir 9 formed as a part of the flushing liquid tank. The reservoir 9 may be filled with a wick or other absorbent member.

Figure 2:
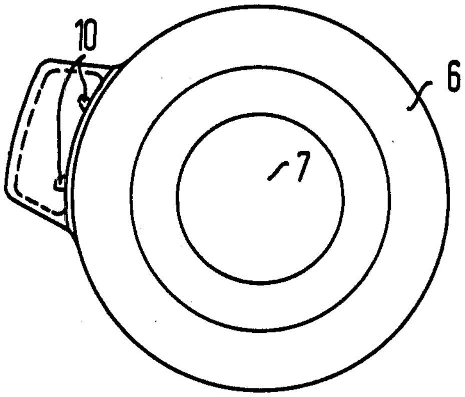
FIG. 2 is a top plan view of the tank of FIG. 1.

As best illustrated in FIGS. 1 and 2, the reservoir is formed as an upwardly opening chamber within the overall flushing liquid tank and ridges 10 are formed to aid in holding the wick in place while at the same time providing an air channel which cooperates with an opening 9 in the peripheral wall of the member 1, open to the reservoir to provide ventilation of the interior of the flushing tank below the membrane 5. By providing the opening to the interior of the flushing tank through the reservoir 9, it is assured that even should the flushing liquid bubble break interiorly of the flushing tank member, that the flushing liquid itself will not escape to the exterior since it will be absorbed in the wick of the reservoir.

After the print head 12 has been fully supplied with the wetting flushing liquid from the flushing liquid tank, the flushing liquid tank is removed and replaced by an ink supply tank constructed in substantially the same manner. Thereafter by applying pressure to the member 7 of the ink supply tank, ink will be forced through the channels of the print head to expel the flushing liquid remaining therein from the print head. In this manner, the print head 12 will be completely filled with ink without the formation of any air bubbles interior thereof and will be immediately ready for printing. During the process of filling the print head 12 with ink, flushing liquid remaining in the channels from the flushing process will be expelled and returned by the channel 15. Moreover because the flushing liquid employed is not mixable with the ink employed, substantially all of the flushing liquid will be removed. Moreover when using the isoparaffin described herein, the flushing liquid will be lighter than the ink so that even should a slight amount of mixing occur, the liquids will separate by themselves so that there is no debasing of the printing ink by the flushing liquid.

Although the teachings of my invention have herein been discussed with reference to specific theories and embodiments, it is to be understood that these are by way of illustration only and that others may wish to utilize my invention in different designs or applications.

I claim as my invention:

1. A device for purging air from print heads of ink printing equipment of the type in which the print head assembly is provided with a configured receipt area for receipt of exchangeable printing ink supply chambers, the improvement of a flushing liquid tank assembly having a liquid chamber interior thereof, the liquid chamber filled with a flushing liquid, the flushing liquid being a liquid which does not mix with the printing ink utilized in the printing equipment and being a liquid which will wet the material of the print head, the flushing liquid tank being dimensioned to be received in the receipt area in communication with ink supply channels interior of the print head, the flushing liquid tank being provided with means for temporarily increasing pressure on the flushing liquid contained within the flushing liquid tank.

2. A device according to claim 1 wherein the flushing liquid tank is dimensioned as a container means exchangeable for a standard ink supply container means used with the printing equipment whereby the flushing liquid tank is receivable in the receipt area in place of an ink supply tank.

3. A device according to claim 2 wherein the flushing liquid tank includes a reservoir means for receipt and storage of excess flushing liquid emitted from the print head during flushing of the print head by the flushing liquid.

4. A device according to claim 1 wherein the flushing liquid is an isoparaffin.

5. A device according to claim 3 wherein the flushing liquid is an isoparaffin.

6. The method of purging air from ink supply channels of ink jet printing heads equipped with replaceable ink supply containers where the print head assembly is provided with a receipt area for receipt of an ink supply container which comprises the steps of providing a flushing liquid container dimensioned to be received in the receipt area, providing a flushing liquid chamber interior of the flushing liquid container, filling the chamber with a flushing liquid which does not mix with the printing liquid utilized in the print head, attaching the container to the receipt area, communicating the chamber to the ink supply channels of the print head, forcing flushing liquid from the chamber through the channels and thereby filling the channels with flushing liquid, dispensing an excess amount of flushing liquid through discharge orifices of the print head, and directing the excess amount back to a reservoir area of the container.

7. The method of claim 6 wherein the flushing liquid provided is an isoparaffin.

* * * * *